United States Patent [19]
Podolak, Jr. et al.

[11] Patent Number: 6,089,237
[45] Date of Patent: Jul. 18, 2000

[54] ELECTRONIC HUMIDOR

[76] Inventors: Edward M. Podolak, Jr., 13928 Esworthy Rd., Germantown, Md. 20874; John P. Peeters, 4607 Harling La., Bethesda, Md. 20814; Larry W. Berkbigler, 456 Aragon Ave., Los Alamos, N. Mex. 87544

[21] Appl. No.: 09/110,224

[22] Filed: Jul. 6, 1998

[51] Int. Cl.⁷ .................................................. A24B 1/02
[52] U.S. Cl. .......................... 131/303; 312/31; 131/300; 131/302
[58] Field of Search .................................... 131/329, 187, 131/257, 300, 302, 303; 239/63; 221/150; 312/31

[56] References Cited

U.S. PATENT DOCUMENTS 5,601,236  2/1997  Wold .
5,842,597  12/1998  Kraus et al. .

FOREIGN PATENT DOCUMENTS 3936977  5/1991  Germany .

OTHER PUBLICATIONS

English Abstract of DE 3936977 —1 page.

*Primary Examiner*—James Derrington
*Assistant Examiner*—Robert McBride
*Attorney, Agent, or Firm*—Dykema Gossett PLLC

[57] ABSTRACT

A device and method are provided for generating moisture in a humidor and regulating the internal humidity of the humidor. The device includes a thermoelectric module, a cold plate, and a heatsink (that may comprise the humidor housing). Energizing the thermoelectric module cools the cold plate below the dew point. The moisture that condenses on the cold plate is directed to the interior of the humidor.

17 Claims, 3 Drawing Sheets

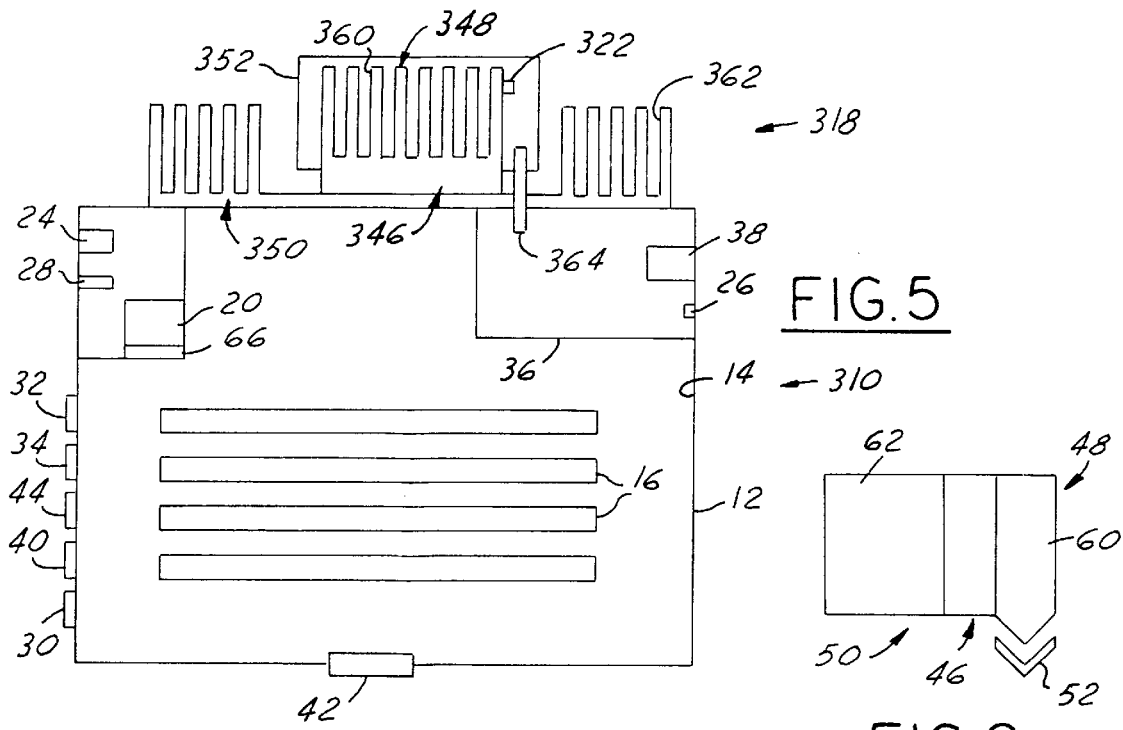
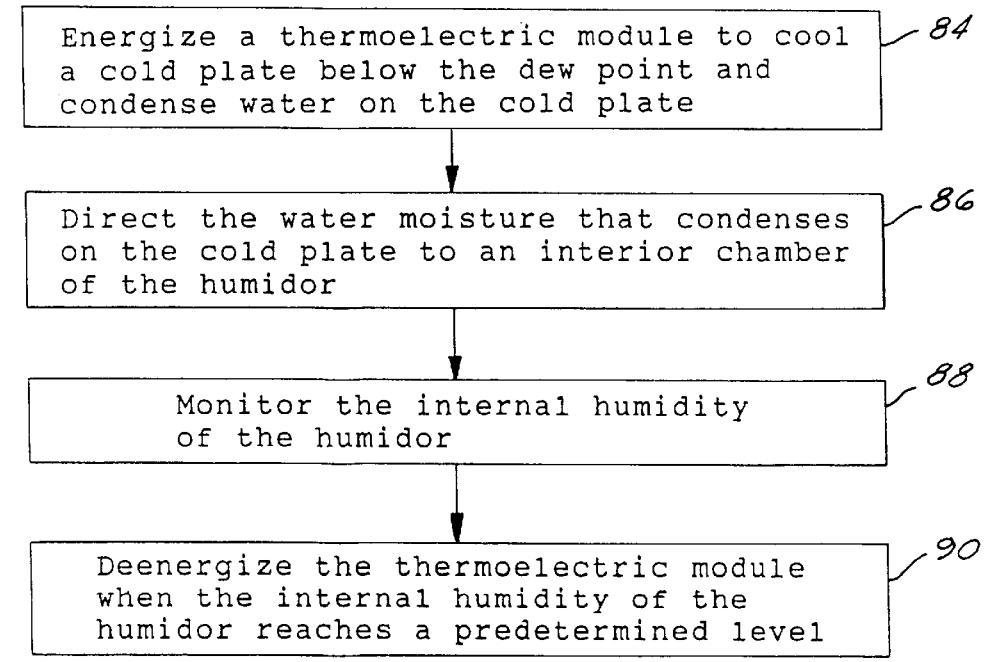

1

ELECTRONIC HUMIDOR

BACKGROUND OF THE INVENTION

1. Field of the Invention

This invention relates to a device and a method for preserving tobacco and tobacco products at optimal storage conditions. In particular, this invention relates to a humidor and a method for providing moisture to the humidor wherein the periodic need for the manual addition of water to the humidor is reduced or eliminated.

2. Disclosure of Related Art

Humidors have long been used to keep tobacco products such as cigars moist and the use of humidors has increased rapidly as cigars have become more popular. In conventional humidors, humidity is controlled by manually adding water to a dispenser located within the humidor. The water evaporates, thereby creating a moist environment for the cigars. The manual addition of water to conventional humidors has several drawbacks. First, it is inconvenient. Second, the manual addition of water is an imprecise method for controlling or adjusting the moisture level within the humidor. Third, the water that is manually added generally comprises tap water that causes salts, minerals, and other contaminants to build up in the humidor. Conventional humidors have also suffered from an inability to control their internal temperature.

There is thus a need for a device and method that minimizes or eliminates one or more of the above-mentioned deficiencies.

SUMMARY OF THE INVENTION

The present invention provides a device and method for preserving tobacco and tobacco products at optimal storage conditions.

One object of the present invention is to reduce or eliminate the need for the manual addition of water to a humidor.

It is a further object of the present invention to ensure that the level of moisture inside a humidor is electronically monitored and regulated without any maintenance needed.

A device for providing moisture to a humidor in accordance with the present invention includes a cold plate that is configured to transmit moisture to the interior of a humidor, and a thermoelectric module that cools the cold plate below the dew point to condense moisture on the cold plate. The device may further include a heatsink that dissipates heat from the thermoelectric module. Alternatively, the housing of the humidor itself may act as a heatsink.

A device in accordance with the present invention may further include a microcontroller for overall control of the device and/or the humidor. The microcontroller may receive signals from a plurality of sensors including: a thermistor, an air moisture sensor, a moisture sensor, a temperature sensor, and a light sensor. The microcontroller may compare data received from the thermistor, air moisture sensor, and temperature sensor to prerecorded data to ensure optimal temperature and moisture levels within the humidor.

A method in accordance with the present invention includes the steps of energizing a thermoelectric module that cools a cold plate below the dew point. The method further includes the step of directing moisture that condenses on the cold plate to the interior of the humidor. The method may further include the steps of monitoring the internal humidity of the humidor and deenergizing the thermoelectric module when the internal humidity reaches a predetermined level.

One advantage of the present invention is that it automatically provides moisture to the interior of a humidor. A further advantage of the present invention is that it automatically monitors and adjusts the internal humidity of the humidor for optimum tobacco storage conditions. Yet another advantage of the present invention is that the moisture provided to the humidor is condensed from the air. As a result, the accumulation of contaminants such as salts and minerals within the humidor is lessened.

These and other features and objects of this invention will become apparent to one skilled in the art from the following detailed description and the accompanying drawings illustrating features of this invention by way of example.

BRIEF DESCRIPTION OF THE DRAWINGS

FIG. 5 is a cross-sectional view of a humidor and a device for providing moisture to the interior of a humidor in accordance with a fourth embodiment of the present invention.

FIG. 6 is a sectional view of the device of FIG. 1 taken substantially along lines 6—6 of FIG. 1.

FIG. 7 is a flowchart illustrating a method for providing moisture to a humidor in accordance with the present invention.

DETAILED DESCRIPTION OF THE PREFERRED EMBODIMENTS

Figure 1:
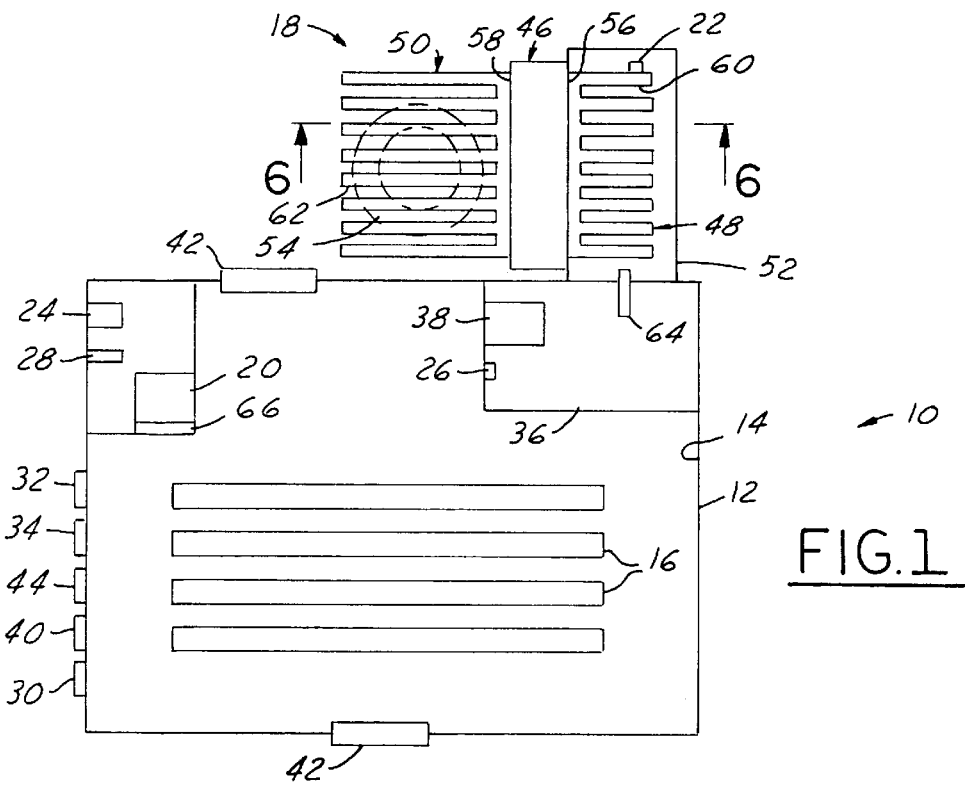
FIG. 1 is a cross-sectional view of a humidor and a device for providing moisture to the interior of a humidor in accordance with one embodiment of the present invention.

Referring now to the drawings wherein like reference numerals are used to identify identical components in the various views, FIG. 1 illustrates a humidor 10 in accordance with the present invention as viewed from above. Humidor 10 includes a housing 12 defining a chamber 14 in which tobacco or tobacco products such as cigars 16 are stored. Humidor 10 also includes a device 18 for providing moisture to humidor 10, and means, such as microcontroller 20, for controlling the operation of device 18 and/or humidor 10. Humidor 10 may further include a thermistor 22, an air moisture sensor 24, a moisture sensor 26, a temperature sensor 28, a light sensor 30, a light emitting device 32, and a display panel 34. Humidor 10 may also include a moisture receiving element 36 and a fan 38. Humidor 10 may further include a low water alarm 40, shutters 42, and a moisture level switch 44.

Housing 12 is provided to store tobacco products such as cigars 16 in a moist environment. Housing 12 is generally constructed from wood selected for its moisture retention and moisture resistivity characteristics. For example, housing 12 may be constructed from unfinished Spanish cedar, a wood that is known in the art to exhibit desirable characteristics for tobacco humidors. It should be understood, however, that housing 12 may be constructed from a plurality of other materials including woods, metals, and plastics. In the illustrated embodiment, housing 12 has a rectangular shape. However, housing 12 may be constructed in various shapes and sizes. Housing 12 defines a chamber 14 in which cigars 16 are stored.

Device 18 is used for providing moisture to the interior of humidor 10. Device 18 may include a thermoelectric module 46, a cold plate 48, a heatsink 50, a moisture collecting pan 52, and a fan 54 for further dissipating heat from device 18.

Module 46 is provided to cool plate 48 below the dew point to form condensation on plate 48. Module 46 has a first surface 56 and a second surface 58. Surface 56 of module 46 is attached to plate 48 and surface 58 is attached to heatsink 50. Module 46 utilizes the Peltier effect whereby a current energizing module 46 causes one surface of module 46—in this case surface 58—to heat up while the other surface—in this case surface 56—cools down. Module 46 is conventional in the art and may be surrounded by a highly insulating plastic material that forms a complete seal around module 46.

Plate 48 is used to condense water moisture on its surface from ambient air once its temperature is lowered below the dew point temperature. Plate 48 may include a plurality of fins 60 to increase the surface area of plate 48 and, consequently, increase the amount of condensation formed thereon. Referring now to FIG. 6, in one embodiment of the present invention, each fin 60 has a tapered end that diverts the condensation on fin 60 away from module 46 and into pan 52. Plate 48 may be formed of a heat-conducting metal such as copper, aluminum, or the like. Plate 48 is attached to surface 56 of module 46 in a standard way known to those skilled in the art.

Referring again to FIG. 1, heatsink 50 is used to dissipate heat that is generated on second surface 58 of module 46. Heatsink 50 may have multiple cooling fins 62 to further dissipate the heat generated by module 46. Heatsink 50 may be formed of a heat-conducting metal such as copper, aluminum, or the like. Heatsink 50 may be painted a dark color such as black to enhance the radiation of heat. Heatsink 50 is attached to second surface 58 of module 46 in a conventional manner to optimize the heat transfer from module 46. The surface area ratio of heatsink 50 to plate 48 can be varied to optimize the cooling of plate 48 below ambient temperature.

Moisture collecting pan 52 is provided to collect water that condenses on plate 48 and to direct the moisture via a tube 64 to moisture receiving element 36 in the interior of housing 12. Moisture collecting pan 52 may be disposed under plate 48 to collect condensation from plate 48. Referring now to FIG. 6, moisture collecting pan 52 may be configured in a V-shape to improve the collection and transfer of moisture. Pan 52 may be made from a variety of conventional metals, plastics or equivalent materials.

Referring to FIG. 1, fan 54 may comprise a brushless electric fan that is provided for drawing air past fins 62 of heatsink 50. Fan 54 is disposed near heatsink 50 to dissipate heat from heatsink 50 to the air. For maximum efficiency, the airflow in and around humidor 10 should be as great as possible to allow for maximum heat transfer and dissipation. In order to minimize the noise and vibration of fan 54, it may be mounted on a noise absorbing material (not shown) such as rubber or the like.

Figure 2:
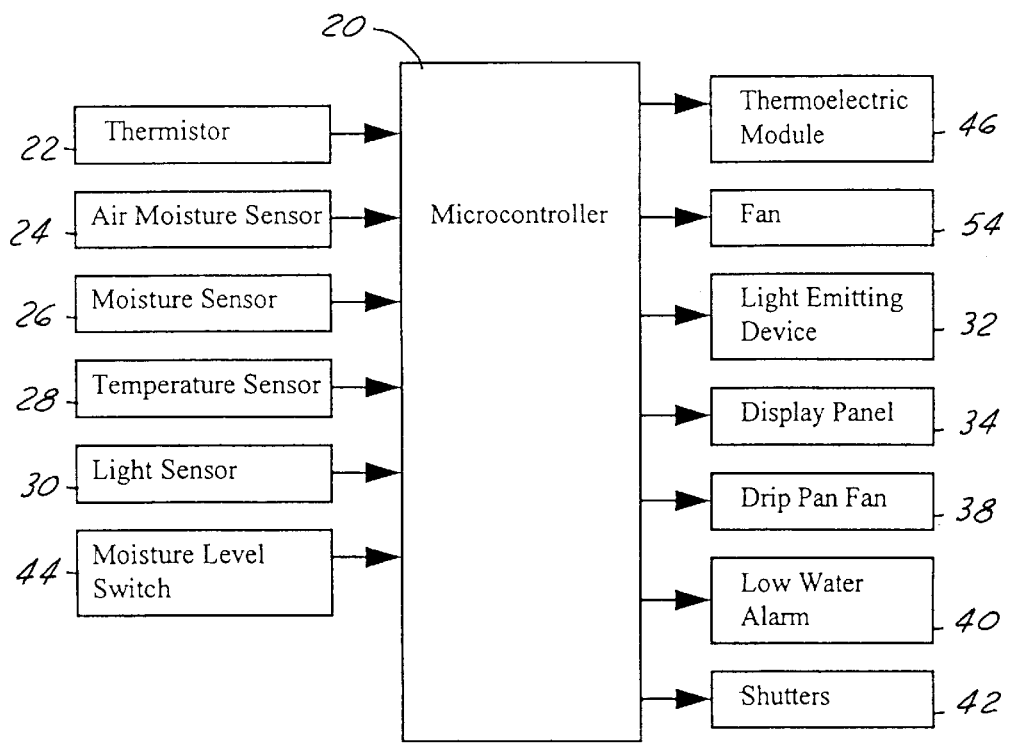
FIG. 2 is a block diagram of the control configuration for a humidor and a device for providing moisture to the interior of the humidor in accordance with the present invention.

Referring now to FIG. 2, microcontroller 20 is provided for the overall control of device 18 and/or humidor 10. In particular, microcontroller 20 is provided for receiving electrical signals from thermistor 22, air moisture sensor 24, moisture sensor 26, temperature sensor 28, light sensor 30, and moisture level switch 44. Microcontroller 20 may output electrical signals to module 46 and fan 54 of device 18, light emitting device 32, display panel 34, fan 38, alarm 40, and shutters 42.

Thermistor 22 is provided to measure the temperature of plate 48 and may be disposed in close proximity to plate 48. Thermistor 22 is conventional in the art and produces an electrical output signal that is proportional to the temperature of plate 48 and is transmitted to microcontroller 20.

Air moisture sensor 24 is provided to measure the humidity within housing 12 and may be disposed within housing 12. Sensor 24 is conventional in the art and produces an electrical output signal that is proportional to the humidity within housing 12 and is transmitted to microcontroller 20.

Referring now to FIG. 1, moisture sensor 26 is provided to determine whether moisture is present or the moisture level within moisture receiving element 36 has reached a predetermined level. Sensor 26 is disposed near element 36. Sensor 26 produces an electrical output signal when the level of moisture in element 36 has reached a predetermined level. The signal is transmitted to microcontroller 20. In an alternate embodiment, sensor 26 may comprise a water sensor or a switch that is triggered when the weight of element 36 reaches a predetermined weight.

Temperature sensor 28 is provided to measure the temperature within housing 12 and may be disposed within housing 12. Sensor 28 is conventional in the art and produces an electrical output signal that is proportional to the measured temperature within housing 12 and is transmitted to microcontroller 20.

Light sensor 30 is provided to determine whether the amount of light outside housing 12 has reached a predetermined level in order to prevent alarm 40 from sounding at night. Sensor 30 may be disposed on the exterior of humidor 10 and may comprise a photocell. An electrical signal is transmitted from sensor 30 to microcontroller 20 if the amount of light received by sensor 30 is above a predetermined level. Microcontroller 20 may control the activation of alarm 40 in response to the signal. Alternatively, light sensor 30 may be directly connected to alarm 40 in a conventional manner.

Low water alarm 40 is provided to produce a sound so that the owner of humidor 10 is warned that external moisture needs to be added to humidor 10 if the collected moisture is insufficient over a period of time. Low water alarm 40 is conventional in the art and may consist of a beeper or a speaker that is responsive to the moisture level sensed by moisture sensor 26. Alarm 40 may be disposed on the exterior of housing 12.

Light emitting device 32 may be provided in lieu of, or in addition to alarm 40 as a means to warn the owner of humidor 10 that the humidity level within housing 12 is insufficient. Device 32 may also be used to indicate a malfunction of humidor 10. Light emitting device 32 is conventional in the art and may consist of a light emitting diode or an equivalent device. In one embodiment, device 32 is disposed on the exterior of housing 12 and is electrically connected to microcontroller 20.

Display panel 34 may be provided to display the humidity, temperature, and overall operational status of humidor 10. Display panel 34 is conventional in the art and may comprise a liquid crystal display or equivalent display. Panel 34 may be disposed on the exterior of housing 12 and is electrically connected to microcontroller 20.

Moisture receiving element 36 is provided for collecting the condensation from plate 48 that flows via tube 64 into the interior of housing 12. The moisture collected in element 36 will be used to provide the humidity required for optimal storage of the cigars. Element 36 is disposed within housing 12 and may be configured in any shape capable of holding moisture. Element 36 can be made from a variety of metals, plastics, or equivalent materials. In one embodiment, element 36 may comprise a compartment (not shown) with aeration holes that holds a sponge (not shown) or foam (not shown) such as Oasis foam that receives and absorbs moisture provided to housing 12. Tube 64 may have weep holes and may lie above or actually penetrate the sponge or foam to facilitate the distribution of moisture within housing 12. The sponge or foam may be partially soaked in a glycol solution to help regulate the internal humidity within housing 12. An additional drain pan (not shown) may be placed under the sponge or foam to collect any excess moisture that leaks out of the sponge or foam. Element 36 may further include a hole with a small tube (not shown) attached to it to allow excess water to drain from element 36 to the exterior of housing 12. In other embodiments, element 36 may comprise a pan capable of holding moisture or the floor of the humidor 10 itself.

Drip pan fan 38 is provided to help disperse the moisture inside housing 12 by blowing air past element 36. Fan 38 is conventional in the art and may comprise an electric fan. Generally, fan 38 is disposed in close proximity to element 36 and is electrically connected to microcontroller 20.

Shutters 42 are provided for allowing external air to flow into the interior of housing 12 to adjust the temperature or humidity within housing 12. Shutters 42 are generally in a closed position. In the illustrated embodiment, two shutters 42 are disposed on housing 12 to allow external air to enter housing 12. However, the number of shutters 42 can vary. Shutters 42 are conventional in the art and can be made from a wide variety of metals, plastics, or equivalent materials. Shutters 42 may be electrically connected to microcontroller 20.

Moisture level switch 44 is provided to allow the owner of humidor 10 to manually adjust the humidity within housing 12. Switch 44 is conventional in the art and allows the user to manually vary the level of current being supplied to thermoelectric module 46. Manual adjustment may be desirable for personal preferences or for special applications such as the storage of cigars with higher than usual moisture requirements. Switch 44 may be electrically connected to microcontroller 20. Alternatively, switch 44 may be connected to module 46 to directly control the energization of module 46.

Operation of humidor 10 and/or device 18 may be controlled by microcontroller 20 which may be programmed in a conventional manner. In particular, microcontroller 20 may regulate the temperature and/or moisture in humidor 10 through control of module 46. Microcontroller 20 may include a memory 66 in which moisture and temperature values are stored. Microcontroller 20 may compare the values in memory 66 to the actual values for moisture and temperature as measured by thermistor 22, air moisture sensor 24, and temperature sensor 28 to determine whether to energize or deenergize module 46 and fan 54. Fan 54 will generally be energized whenever module 46 is energized to ensure no overheating of module 46 occurs.

Microcontroller 20 may alternately control the humidity within housing 12 without energizing module 46. If the electrical signal from air moisture sensor 24 falls below a predetermined level, microcontroller 20 may generate an electrical output signal to activate fan 38. The activation of fan 38 would increase the humidity within housing 12 by blowing air over the moisture contained in element 36. In the alternative, if the signal from sensor 24 rises above another predetermined level, microcontroller 20 may generate an electrical output signal to open shutters 42 and thereby lower the humidity within housing 12 by allowing the air within housing 12 to exit.

Microcontroller 20 may also control the humidity within housing 12 in response to moisture level switch 44. Switch 44 may generate an electrical output signal that is received by the microcontroller 20. This electrical output signal could direct the microcontroller 20 to activate or deactivate module 46 without regard to the electrical output signals being received from thermistor 22, air moisture sensor 24, moisture sensor 26, or temperature sensor 28. In another embodiment, switch 44 could generate an electrical output signal that would be transmitted directly to module 46 to energize or deenergize module 46 without using microcontroller 20.

Figure 3:
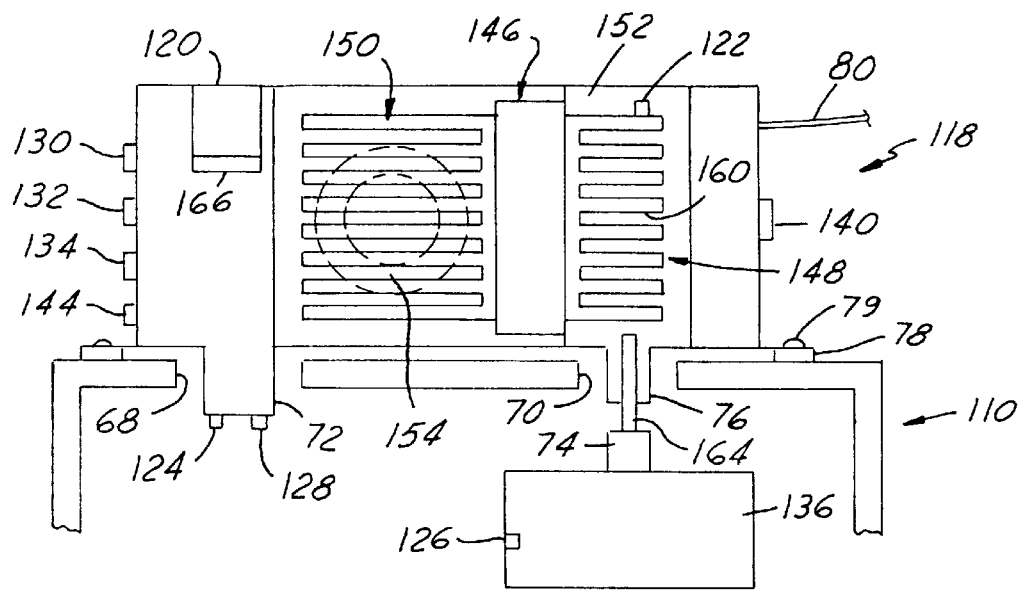
FIG. 3 is a cross-sectional view of a device for providing moisture to a humidor in accordance with a second embodiment of the present invention.

Referring now to FIG. 3 of the drawings, a device 118 in accordance with a second embodiment of the present invention may be packaged as an add-on unit to a humidor 110. Device 118 may include a thermoelectric module 146, a cold plate 148, a heatsink 150, a moisture collecting pan 152, a fan 154, and a tube 164. Device 118 may further include a microcontroller 120 having a memory 166, a thermistor 122, an air moisture sensor 124, a moisture sensor 126, a temperature sensor 128, a light sensor 130, a light emitting device 132, a display panel 134, a moisture receiving element 136, a low water alarm 140, and a moisture level switch 144. Each of the above-mentioned elements of device 118 is identical to or similar to elements found in device 18 or humidor 10 and have been numbered in a similar fashion. A detailed description of these elements may be found hereinabove.

Device 118 may further include mounting prongs 72 and 76, a tube connector 74, a mounting plate 78, and screws 79. Device 118 may be added to humidor 110 by drilling a hole 68 and a hole 70 in one side of humidor 110, inserting prongs 72 and 76 through holes 68 and 70, and inserting screws 79 through plate 78 and into humidor 110. In this embodiment, sensor 124 and sensor 128 may be included as part of mounting prong 72. Tube connector 74 is provided in mounting prong 76 to allow tube 164 to be connected to element 136.

External power is provided to device 118 via power connector 80. Module 146 operates at approximately 9 Volts DC and the power may be provided by an AC transformer (not shown) that plugs directly into a conventional electrical outlet. The typical current rating of the transformer is approximately 1 Amp. However, the transformer current rating may vary depending on the size of module 146 and on whether or not additional modules 146 are used. Module 146 may comprise model number CPO.8-127-06L from Melcor Corporation of Trenton, N.J.

In areas where the relative humidity is frequently low, larger thermoelectric modules may be required because insufficient moisture will otherwise be collected. Experimental results show that device 118 can typically generate water amounts well in excess of those needed daily for a normal size humidor (holding between 20–100 cigars). The electricity used for module 146 of device 118 (assuming 50% humidity) is approximately 10 Watts averaged over a day or approximately one tenth the electricity used for a single household lamp.

Figure 4:
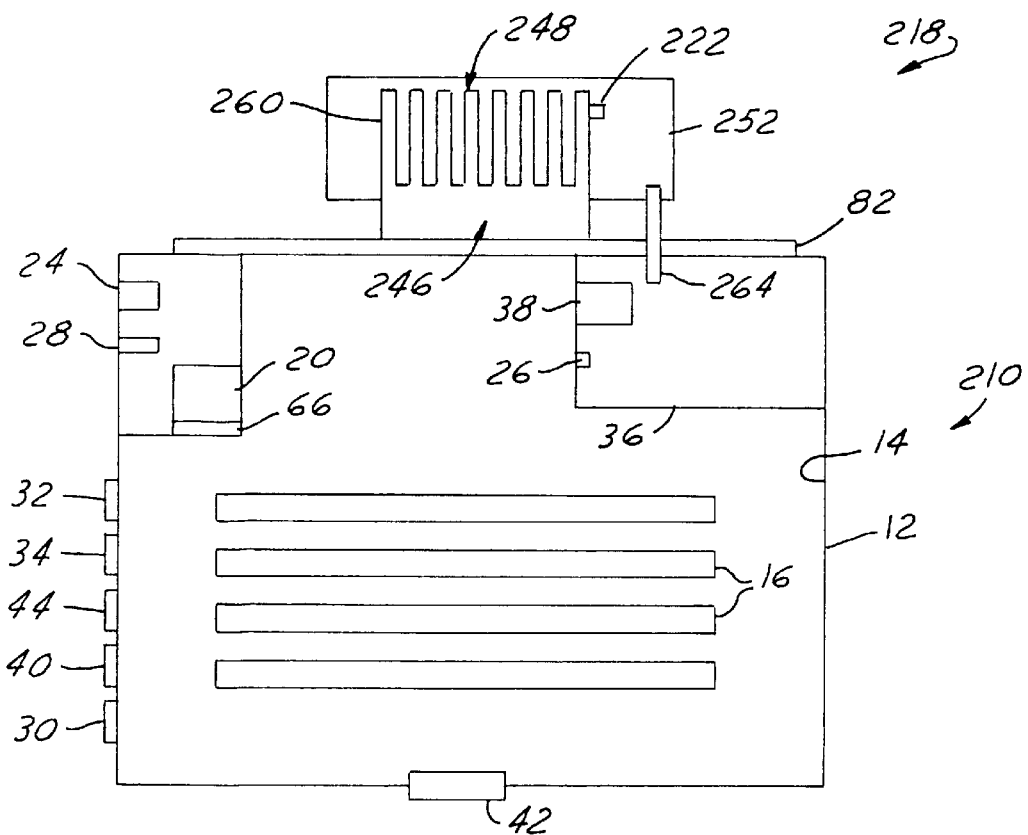
FIG. 4 is a cross-sectional view of a humidor and a device for providing moisture to the interior of a humidor in accordance with a third embodiment of the present invention.

Referring now to FIG. 4, a device 218 in accordance with a third embodiment of the present invention is shown. Device 218 may include a thermoelectric module 246, a cold plate 248, a thermistor 222, a moisture collecting pan 252, and a tube 264. As in device 18, thermistor 222 may be disposed near plate 248, fins 260 may include a tapered end, and pan 252 may be V-shaped in cross-section. Unlike devices 18 and 118, device 218 may not include a separate heatsink. Rather housing 12 of humidor 210 or a heat conducting cover plate 82 disposed on humidor 210 may serve as a heatsink. Housing 12 or the cover plate 82 may be composed of a heat-conducting material such as copper, aluminum, or the like. In this embodiment, module 246 is mounted directly onto housing 12 or cover plate 82 and fins 260 of plate 248 extend away from humidor 210. A fan may no longer be necessary to dissipate heat because the large surface area provided by housing 12 or cover plate 82 may adequately dissipate the heat from module 246.

Referring now to FIG. 5, a device 318 in accordance with a fourth embodiment of the present invention is illustrated. Device 318 includes a thermoelectric module 346, a cold plate 348, a heatsink 350, a moisture collecting pan 352, and a tube 364. As in device 18, thermistor 322 may be disposed near plate 348, fins 360 may include a tapered end, and pan 352 may be V-shaped in cross-section. In this embodiment, heatsink 350 is mounted directly onto housing 12 of humidor 310 and fins 360, 362 of plate 348 and heatsink 350, respectively, extend away from humidor 310. A fan may no longer be necessary to dissipate heat in this embodiment because the large surface area of fins 362 may adequately dissipate the heat from module 346.

Referring to FIG. 7, a method of operating a humidor in accordance with the present invention will be described. The method includes the step 84 of energizing a thermoelectric module to cool a cold plate below the dew point and condense water on the plate. The method further includes the step 86 of directing the water moisture that condenses on the plate to the interior of a humidor. The method may further comprise the step 88 of monitoring the internal humidity within the humidor and the step 90 of deenergizing the thermoelectric module when the internal humidity within the humidor reaches a predetermined level.

As has been shown, the present invention allows the temperature and moisture levels inside a humidor to be automatically controlled using a thermoelectric module under the control of a programmable microcontroller. As a result, the present invention reduces or eliminates the need for the manual addition of water to a humidor.

Thus, it is apparent that there has been provided in accordance with the present invention a method and device that fully satisfies the objects, aims and advantages as set forth above. While the invention has been described in connection with specific embodiments thereof, it is evident that many alternatives modifications, and variations will be apparent to those skilled in the art in light of the foregoing description. For example, the microcontroller could be replaced by discrete electronic circuits. Accordingly, it is intended to embrace such alternatives, modifications, and variations that fall within the spirit and broad scope of the appended claims.

We claim:

1. A device for providing moisture to a humidor comprising:

a cold plate configured to transmit moisture to said humidor, said cold plate having a plurality of cooling fins, at least one cooling fin of said plurality of fins having a tapered end; and, a thermoelectric module that cools said cold plate to condense moisture on said cold plate; and, a heat sink attached to said thermoelectric module wherein both said heat sink and said thermoelectric module are in direct thermal communication with ambient air and said heat sink dissipates heat from said thermoelectric module.

2. The device of claim 1, further comprising a V-shaped drip pan that collects moisture from said cold plate.

3. The device of claim 1, further comprising a microcontroller for selectively energizing said thermoelectric module.

4. The device of claim 1, further comprising a thermistor disposed near said cold plate.

5. A humidor comprising:

a housing; and, a cold plate disposed outside of said housing and configured to transmit moisture to the interior of said housing; and, a thermoelectric module in direct thermal communication with ambient air that cools said cold plate to condense moisture on said cold plate; and, a heat sink attached to said thermoelectric module wherein said heat sink is in direct thermal communication with ambient air and said heat sink dissipates heat from said thermoelectric module.

6. The humidor of claim 5, further comprising a fan disposed near said heatsink to dissipate heat from said heatsink.

7. The humidor of claim 5, wherein said housing dissipates heat from said thermoelectric module.

8. The humidor of claim 5, further comprising a heat conducting cover plate attached to said thermoelectric module.

9. The humidor of claim 5, further comprising a microcontroller for selectively energizing said thermoelectric module.

10. The humidor of claim 5, further comprising an air moisture sensor disposed within said humidor housing.

11. The humidor of claim 5, further comprising a thermistor disposed near said cold plate.

12. The humidor of claim 5, further comprising:

a drip pan disposed within said housing; and, a moisture sensor; and, a low water alarm, wherein said moisture sensor generates a signal when a level of moisture within said drip pan is below a predetermined level, said signal activating said low water alarm.

13. The humidor of claim 12, further comprising a light sensor that interrupts said low water alarm when an amount of light outside said humidor is below a predetermined level.

14. The humidor of claim 5, further comprising a light emitting device that is disposed on the exterior of said humidor housing.

15. The humidor of claim 5, further comprising a moisture level switch for varying a current level of said thermoelectric module.

16. A method for providing moisture to an internal chamber of a humidor comprising the steps of:

energizing a thermoelectric module in direct communication with ambient air to cool a cold plate disposed outside of said internal chamber below the dew point and condense water on said cold plate dissipating heat from said thermoelectric module through a heat sink directly to ambient air, wherein said heat sink is attached to said thermoelectric module; and directing said water moisture into said internal chamber of said humidor.

17. The method of claim 16, further comprising the steps of:

monitoring an internal humidity of said humidor; and, deenergizing said thermoelectric module when said internal humidity of said humidor reaches a predetermined level.

* * * * *